US012696005B2

(12) United States Patent
Reshetouski et al.

(10) Patent No.: US 12,696,005 B2
(45) Date of Patent: Jul. 28, 2026

(54) IMAGING DEVICE AND METHOD OF OPERATING IMAGING DEVICE

(71) Applicant: Sony Group Corporation, Tokyo (JP)

(72) Inventors: Ilya Reshetouski, Tokyo (JP); Hideki Oyaizu, Tokyo (JP); Ryuichi Tadano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 144 days.

(21) Appl. No.: 18/709,521

(22) PCT Filed: Nov. 25, 2022

(86) PCT No.: PCT/JP2022/043439
§ 371 (c)(1),
(2) Date: May 13, 2024

(87) PCT Pub. No.: WO2023/106115
PCT Pub. Date: Jun. 15, 2023

(65) Prior Publication Data
US 2025/0039570 A1 Jan. 30, 2025

(30) Foreign Application Priority Data
Dec. 10, 2021 (JP) ................................. 2021-201148

(51) Int. Cl.
*H04N 25/615* (2023.01)
(52) U.S. Cl.
CPC ................................. *H04N 25/615* (2023.01)
(58) Field of Classification Search
CPC ........... H04N 5/23232; H04N 13/0282; H04N 9/045; H04N 5/2254; H04N 5/2258;
H04N 9/097; H04N 23/955; H04N
23/957; H04N 23/95; H04N 25/00; G06T
3/4053; G06T 5/50; G06T 2207/10052;
G06T 5/00;
(Continued)

(56) References Cited

U.S. PATENT DOCUMENTS 4,360,797 A     11/1982 Fenimore et al.
2006/0157640 A1*   7/2006 Perlman ................. H04N 25/00
                                                        348/E5.079

(Continued)

FOREIGN PATENT DOCUMENTS

JP          2009-529160 A     8/2009
WO     WO 2021/111888 A1     6/2021

OTHER PUBLICATIONS

Busboom et al., Coded aperture imaging with multiple measurements, J. Opt. Soc. Am. A, May 1997, pp. 1058-1065, vol. 14, No. 5.

(Continued)

*Primary Examiner* — Abdelaaziz Tissire
(74) *Attorney, Agent, or Firm* — Paratus Law Group, PLLC

(57) ABSTRACT

There is provided an imaging device capable of improving image quality of a reconstructed image in lensless imaging, and a method of operating the imaging device. A mask that is provided at a preceding stage of an imaging element and modulates incident light is a mask including a pattern defined by a non-binary URA. The present disclosure can be applied to a lensless camera.

9 Claims, 8 Drawing Sheets

(58) Field of Classification Search
CPC ......... G06T 1/0007; G06T 2207/20084; G06T
3/4015; G06T 5/75; G06T 7/557
See application file for complete search history.

(56) References Cited

U.S. PATENT DOCUMENTS

| | | | | |
|---|---|---|---|---|
| 2007/0035653 A1* | 2/2007 | Hong | ......................... | G06T 5/50 |
| | | | | 348/340 |
| 2009/0020714 A1* | 1/2009 | Slinger | .................. | H04N 25/00 |
| | | | | 250/550 |
| 2010/0155609 A1* | 6/2010 | Silva | .................... | G02B 5/1876 |
| | | | | 250/363.06 |
| 2011/0085051 A1* | 4/2011 | Chi | ........................... | G02F 1/35 |
| | | | | 348/222.1 |
| 2014/0267818 A1* | 9/2014 | Perlman | .................. | H04N 25/70 |
| | | | | 348/222.1 |
| 2019/0265107 A1* | 8/2019 | Wang | ...................... | G03F 7/001 |
| 2021/0239528 A1* | 8/2021 | Houck | ................... | H04N 25/13 |

OTHER PUBLICATIONS

Fenimore et al., Coded aperture imaging with uniformly redundant arrays, Applied Optics, 1978, pp. 337-347, vol. 17, Issue 3.
Finger et al., Hexagonal Uniformly Redundant Arrays for Coded-Aperture Imaging, 19th International Cosmic Ray Conference (ICRC19), 1985, pp. 295-298, vol. 3.
Gottesman et al., New family of binary arrays for coded aperture imaging, Applied Optics, Oct. 15, 1989, pp. 4344-4352, Vo. 28, No. 20.

* cited by examiner

IMAGING DEVICE AND METHOD OF OPERATING IMAGING DEVICE

CROSS REFERENCE TO PRIOR APPLICATION

This application is a National Stage Patent Application of PCT International Patent Application No. PCT/JP2022/043439 (filed on Nov. 25, 2022) under 35 U.S.C. § 371, which claims priority to Japanese Patent Application No. 2021-201148 (filed on Dec. 10, 2021), which are all hereby incorporated by reference in their entirety.

TECHNICAL FIELD

The present disclosure relates to an imaging device and a method of operating the imaging device, and more particularly, to an imaging device capable of improving image quality of a reconstructed image in lensless imaging, and a method of operating the imaging device.

BACKGROUND ART

A lensless imaging device has a configuration in which a mask including a transmission region that transmits incident light and a non-transmission region that does not transmit incident light is disposed at a preceding stage of an imaging surface of an imaging element.

In this lensless imaging device, incident light is modulated by a mask, the modulated incident light is imaged as a modulated image by an imaging element, and signal processing is applied to the modulated image, so that an image including the incident light is reconstructed.

With such a configuration, in the lensless imaging device, the arrangement of the transmission region and the non-transmission region in the mask affects the image quality of the image reconstructed.

It is known that high image quality can be achieved by arranging the transmission region and the non-transmission region in the mask in a pattern including a circulation-type arrays, and in particular, a mask including a uniformly redundant arrays (URA) pattern is exemplified as an optimal mask (see Patent Document 1 and Non-Patent Documents 1 and 2).

Other lensless imaging devices using a mask including a URA pattern or a pattern close to the URA pattern have also been proposed (see Patent Document 1 and Non-Patent Documents 1 to 4).

CITATION LIST

Patent Document

Patent Document 1: U.S. Pat. No. 4,360,797

Non-Patent Document

Non-Patent Document 1: "Coded aperture imaging with uniformly redundant arrays", E. E. Fenimore and T. M. Cannon, Appl. Opt. 17, 337-347 (1978)
Non-Patent Document 2: "Coded aperture imaging with multiple measurements", Busboom, A., Schotten, H. D., and Elders-Boll, H.: 1997b, J. Opt. Soc. Am. A 14, 1058-1065.
Non-Patent Document 3: "New family of binary arrays for coded aperture imaging", Stephen R. Gottesman and E. E. Fenimore, Appl. Opt. 28, 4344-4352 (1989).

Non-Patent Document 4: "Hexagonal uniformly redundant arrays for coded-aperture imaging", Finger, M. H., and T. A. Prince. 19th International Cosmic Ray Conference (ICRC19), Volume 3. Vol. 3. 1985.

SUMMARY OF THE INVENTION

Problems to be Solved by the Invention

However, the number of arrays available for the circulation-type array that can be applied to the URA pattern is limited, and options in designing the lensless imaging device, particularly the mask pattern, are limited.

Furthermore, in a long wavelength band of visible light, infrared light, or the like, an influence due to a diffraction effect occurs, which causes deterioration in image quality.

Therefore, an appropriate URA pattern may not be formed depending on the relationship between the size of the imaging element and the size of the mask, and as a result, there has been a possibility that the image quality of an image reconstructed on the basis of the modulated image modulated by the mask is deteriorated.

The present disclosure has been made in view of such a situation, and particularly, it is an object of the present disclosure to improve image quality of a reconstructed image in lensless imaging.

Solutions to Problems

An imaging device according to one aspect of the present disclosure is an imaging device including: a mask that includes a plurality of optical elements having different transmittances and being arranged in a pattern defined by non-binary uniformly redundant arrays (URA) and modulates incident light into modulated light by transmitting the incident light through the plurality of optical elements; an imaging element that captures a modulated image including the modulated light transmitted through the mask; and a reconstruction unit that reconstructs an image corresponding to the incident light on the basis of the modulated image.

A method of operating an imaging device according to one aspect of the present disclosure is a method of operating an imaging device, the imaging device including a mask that includes a plurality of optical elements having different transmittances and being arranged in a pattern defined by non-binary uniformly redundant arrays (URA) and modulates incident light into modulated light by transmitting the incident light through the plurality of optical elements, an imaging element that captures a modulated image including the modulated light transmitted through the mask, and a reconstruction unit that reconstructs an image corresponding to the incident light on the basis of the modulated image, the method including the steps of: modulating the incident light into modulated light by the mask transmitting the incident light through a plurality of optical elements having different transmittances and being arranged in the pattern defined by the non-binary URA; capturing by the imaging element a modulated image including the modulated light transmitted through the mask; and reconstructing an image corresponding to the incident light on the basis of the modulated image.

According to one aspect of the present disclosure, a mask that includes a plurality of optical elements having different transmittances and being arranged in a pattern defined by non-binary uniformly redundant arrays (URA) modulates incident light into modulated light by transmitting the incident light through the plurality of optical elements, modulated image including the modulated light transmitted through the mask is captured, and an image corresponding to the incident light is reconstructed on the basis of the modulated image.

BRIEF DESCRIPTION OF DRAWINGS

FIG. 10 is a diagram illustrating comparison of images reconstructed in a case of using the non-binary mask in FIG. 9 and a binary mask having the same size.

MODE FOR CARRYING OUT THE INVENTION

Hereinafter, preferred embodiments of the present disclosure will be described in detail with reference to the accompanying drawings. Note that, in the present specification and the drawings, components having substantially the same functional configuration are denoted by the same reference signs, and redundant descriptions are omitted.

Hereinafter, modes for carrying out the present technology will be described. The description will be given in the following order.

1. Outline of lensless imaging device
  2. Configuration example of lensless imaging device of present disclosure
  3. Generation example of non-binary mask
<<1. Outline of Lensless Imaging Device>>
The outline of a lensless imaging device will be described with reference to FIG. 1. Note that FIG. 1 is a side cross-sectional view of a lensless imaging device 11.

Figure 1:
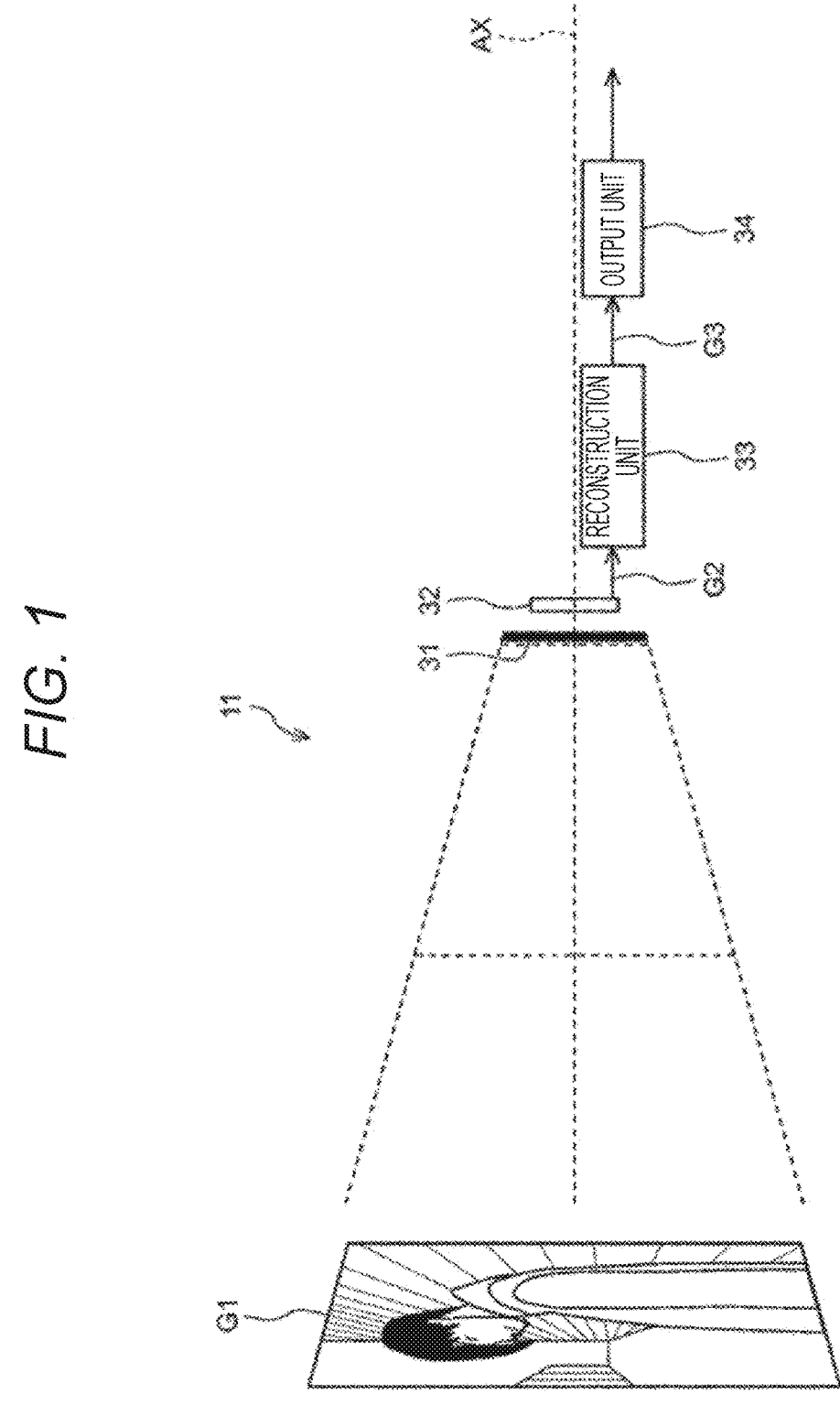
FIG. 1 is a diagram illustrating an outline of a lensless camera.

The lensless imaging device 11 in FIG. 1 is a so-called lensless camera, and includes a mask 31, an imaging element 32, a reconstruction unit 33, and an output unit 34.

Figure 2:
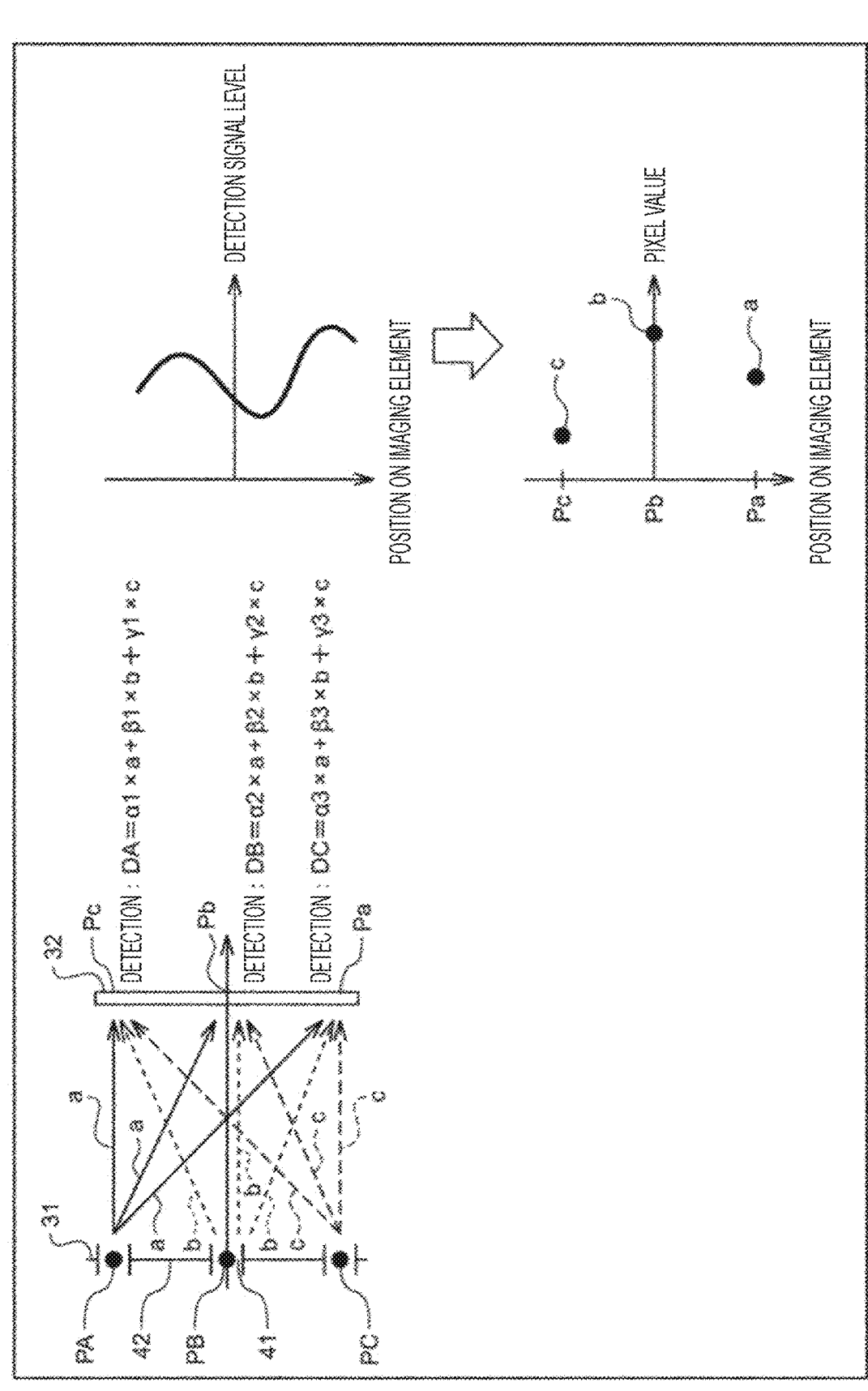
FIG. 2 is a diagram illustrating an imaging principle of a lensless camera.

The mask 31 has a plate-shaped configuration containing a light-shielding material and provided at a preceding stage of the imaging element 32, and is formed with a transmission region 41 including a hole-shaped opening portion that transmits incident light and a light-shielded light-shielding region 42 other than the transmission region 41, for example, as illustrated in a left part of FIG. 2.

In other words, the mask 31 can also be regarded as a binarized mask, that is, a binary mask by expressing the region, in which the transmission region 41 and the light-shielding region 42 are configured, with transmittances 1 and 0, for example. Furthermore, the pattern of 1 and 0 in the binarized mask 31 is a circulation-type pattern, for example, a pattern of uniformly redundant arrays (URA).

Note that, hereinafter, the mask 31 is also referred to as the binary mask 31 as necessary.

When the mask (binary mask) 31 receives light from a subject surface (in reality, a surface from which radiation light from a three-dimensional subject is emitted) G1 indicated by an optical axis AX as incident light, the mask 31 transmits the incident light via the transmission region 41, thereby modulates the incident light from the subject surface G1 as a whole to convert into modulated light, and causes the imaging element 32 to receive and image the converted modulated light.

The imaging element 32 includes a complementary metal oxide semiconductor (CMOS) image sensor or a charge coupled device (CCD) image sensor, images modulated light obtained by modulating incident light from the subject surface G1 by the mask 31, and outputs the modulated light to the reconstruction unit 33 as a modulated signal G2.

Note that the mask 31 has a size that covers at least the entire surface of the imaging element 32, and basically, in the imaging element 32, only modulated light modulated by being transmitted through the mask 31 is received.

Furthermore, the transmission region 41 formed in the mask 31 has a size larger than at least a pixel size of the imaging element 32. Furthermore, a gap having a minute distance d is provided between the imaging element 32 and the mask 31.

For example, as illustrated in an upper left part of FIG. 2, it is assumed that incident light from point light sources PA, PB, and PC on the subject surface G1 is transmitted through the transmission region 41 of the mask 31 and individually received as light beams of light intensities a, b, and c at positions Pa, Pb, and Pc on the imaging element 32, respectively.

As illustrated in the upper left part of FIG. 2, detection sensitivity of each pixel has directivity according to an incident angle, when the incident light is modulated by the transmission region 41 that is set in the mask 31. Providing the detection sensitivity of each pixel with the incident angle directivity here means providing light receiving sensitivity characteristics according to the incident angle of the incident light so as to be different in accordance with the region on the imaging element 32.

That is, in a case of assuming that a light source constituting the subject surface G1 is a point light source, in the imaging element 32, light beams having the same light intensity and emitted from the same point light source are incident, but the incident angle changes for each region on the imaging surface of the imaging element 32 by being modulated by the mask 31. Then, light receiving sensitivity characteristics, that is, the incident angle directivity is provided as the mask 31 changes the incident angle of the incident light in accordance with the region on the imaging element 32. Therefore, even light beams having the same light intensity are to be detected by the mask 31 provided at a preceding stage of the imaging surface of the imaging element 32 with different sensitivities in individual regions on the imaging element 32, and detection signals having different detection signal levels in each region are detected.

More specifically, as illustrated in an upper right part of FIG. 2, detection signal levels DA, DB, and DC of pixels at the positions Pa, Pb, and Pc on the imaging element 32 are expressed by Formulas (1) to (3) below, respectively. Note that, Formulas (1) to (3) in FIG. 2 have an inverted vertical relationship with the positions Pa, Pb, and Pc on the imaging element 32 in FIG. 2.

$$DA = \alpha 1 \times a + \beta 1 \times b + \gamma 1 \times c \qquad (1)$$

$$DB = \alpha 2 \times a + \beta 2 \times b + \gamma 2 \times c \qquad (2)$$

$$DC = \alpha 3 \times a + \beta 3 \times b + \gamma 3 \times c \qquad (3)$$

Here, $\alpha 1$ is a coefficient for a detection signal level "a" set in accordance with an incident angle of a light beam from the point light source PA on the subject surface G1 to be restored at the position Pa on the imaging element 32.

Furthermore, $\beta 1$ is a coefficient for a detection signal level "b" set in accordance with an incident angle of a light beam from the point light source PB on the subject surface G1 to be restored at the position Pa on the imaging element 32.

Moreover, $\gamma 1$ is a coefficient for a detection signal level "c" set in accordance with an incident angle of a light beam from the point light source PC on the subject surface G1 to be restored at the position Pa on the imaging element 32.

Therefore, $(\alpha 1 \times a)$ in the detection signal level DA indicates a detection signal level by a light beam at the position Pa from the point light source PA.

Furthermore, $(\beta 1 \times b)$ in the detection signal level DA indicates a detection signal level by a light beam at the position Pa from the point light source PB.

Moreover, $(\gamma 1 \times c)$ in the detection signal level DA indicates a detection signal level by a light beam at the position Pa from the point light source PC.

Therefore, the detection signal level DA is expressed as a composite value obtained by multiplying individual components of the point light sources PA, PB, and PC at the position Pa by the individual coefficients $\alpha 1$, $\beta 1$, and $\gamma 1$. Hereinafter, the coefficients $\alpha 1$, $\beta 1$, and $\gamma 1$ are collectively referred to as a coefficient set.

Similarly, for the detection signal level DB in the point light source Pb, a coefficient set $\alpha 2$, $\beta 2$, and $\gamma 2$ individually corresponds to the coefficient set $\alpha 1$, $\beta 1$, and $\gamma 1$ for the detection signal level DA in the point light source PA. Furthermore, for the detection signal level DC in the point light source Pc, a coefficient set $\alpha 3$, $\beta 3$, and $\gamma 3$ individually corresponds to the coefficient set $\alpha 1$, $\beta 1$, and $\gamma 1$ for the detection signal level DA in the point light source Pa.

However, detection signal levels of pixels at the positions Pa, Pb, and Pc are values expressed by a product-sum of the coefficients and the light intensities a, b, and c of light beams emitted from the point light sources PA, PB, and PC, respectively. Therefore, these detection signal levels are different from those of an image in which an image of the subject is formed, since the light intensities a, b, and c of the light beams emitted from the respective point light sources PA, PB, and PC are intermingled. Note that an image including the detection signal levels DA, DB, and DC of the pixels at the positions Pa, Pb, and Pc corresponds to the modulated signal G2 in FIG. 1.

That is, by constructing simultaneous equations using the coefficient set $\alpha 1$, $\beta 1$, and $\gamma 1$, the coefficient set $\alpha 2$, $\beta 2$, and $\gamma 2$, and the coefficient set $\alpha 3$, $\beta 3$, and $\gamma 3$, and the detection signal levels DA, DB, and DC, and solving the light intensities a, b, and c, pixel values at the individual positions Pa, Pb, and Pc are obtained as illustrated in a lower right part of FIG. 2. As a result, a restored image (final image) that is a set of pixel values is reconstructed and restored. Note that the image reconstructed corresponds to an image G3 in FIG. 1.

Furthermore, in a case where a distance between the imaging element 32 illustrated in the upper left part of FIG. 2 and the subject surface G1 changes, the coefficient set $\alpha 1$, $\beta 1$, and $\gamma 1$, the coefficient set $\alpha 2$, $\beta 2$, and $\gamma 2$, and the coefficient set $\alpha 3$, $\beta 3$, and $\gamma 3$ individually change. However, by changing the coefficient set, restored images (final images) of the subject surface at various distances can be reconstructed.

Therefore, by changing the coefficient set to that corresponding to various distances by one time of imaging, images of the subject surface at various distances from an imaging position can be reconstructed.

As a result, in imaging using the lensless imaging device 11 in FIG. 1, it is not necessary to be aware of a phenomenon such as so-called defocus, which occurs when imaging is performed in a state where focusing is shifted in imaging by an imaging device using a lens. Further, if imaging is performed such that a subject desired to be imaged is included in a visual field, images of a subject surface at various distances can be reconstructed after imaging, by changing the coefficient set according to the distance.

Note that, since the detection signal level illustrated in the upper right part of FIG. 2 is not a detection signal level corresponding to an image in which the image of the subject is formed, it is not a pixel value but a simple observation value and corresponds to the modulated signal G2 including the observation value. Furthermore, since the detection signal level illustrated in the lower right part of FIG. 2 is a value of each pixel of the restored image (final image) restored on the basis of a signal value for each pixel corresponding to the image in which the image of the subject is formed, that is, the modulated signal G2, the imaging result includes a pixel value. That is, the restored image (final image) of the subject surface G1 corresponds to the image G3.

With such a configuration, since the imaging lens is not an essential component in the lensless imaging device 11, it is possible to reduce a profile of the imaging device, that is, to reduce a thickness with respect to the incident direction of light in the configuration that implements the imaging function. Furthermore, by variously changing the coefficient set, it is possible to reconstruct and restore the final image (restored image) on the subject surface at various distances.

Note that, hereinafter, an image corresponding to the modulated signal G2 before being reconstructed captured by the imaging element 32 is simply referred to as a modulated image, and an image corresponding to the image G3 reconstructed and restored by signal processing of the modulated image is referred to as a final image (restored image). Therefore, from one modulated image, images on the subject surface G1 at various distances can be reconstructed and restored as the final image by variously changing the coefficient set described above.

The reconstruction unit 33 includes the above-described coefficient set, and reconstructs the final image (restored image or image) (image G3 in FIG. 1) on the basis of the modulated image (modulated signal G2 in FIG. 1) captured by the imaging element 32 using a coefficient set corresponding to the distance from the imaging position of the lensless imaging device 11 to the subject surface G1, and outputs the final image to the output unit 34.

The output unit 34 performs signal processing on the final image supplied from the reconstruction unit 33 and outputs the final image as an image signal.

<Imaging Process by Imaging Device in FIG. 1>

Figure 3:
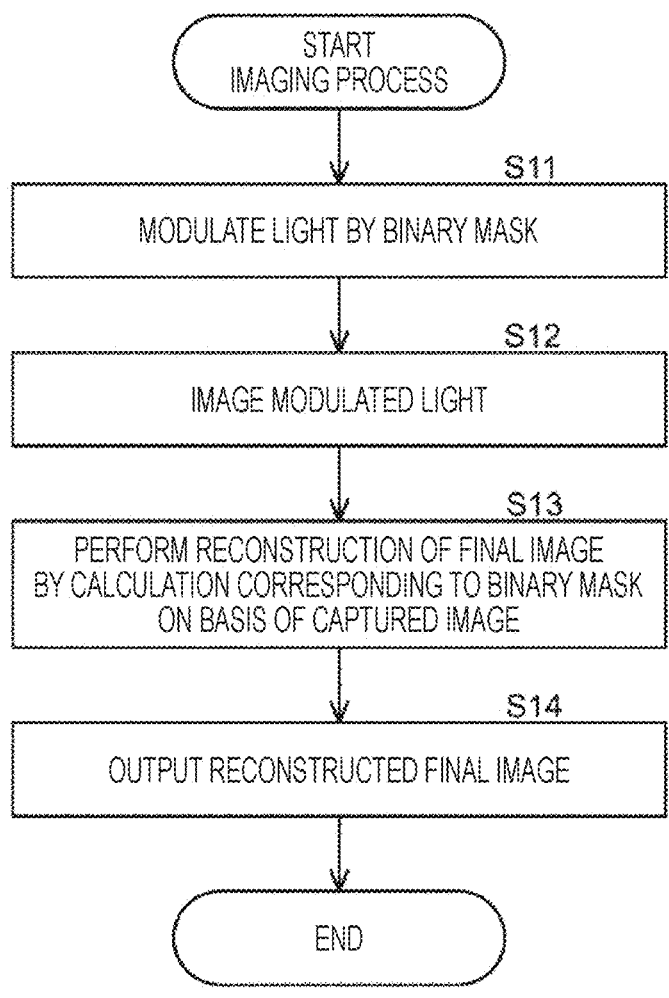
FIG. 3 is a flowchart illustrating an imaging process of the lensless camera.

Next, an imaging process performed by the lensless imaging device 11 in FIG. 1 will be described with reference to a flowchart of FIG. 3.

In step S11, the mask (binary mask) 31 modulates the light from the subject surface G1 and causes the light to enter the imaging element 32.

In step S12, the imaging element 32 captures an image formed by light from the subject surface G1 and modulated by the mask (binary mask) 31, and outputs the captured image to the reconstruction unit 33 as a modulated image (corresponding to the modulated signal G2).

In step S13, on the basis of the modulated image (corresponding to the modulated signal G2) obtained by capturing the image formed by the modulated light output from the imaging element 32, the reconstruction unit 33 reconstructs an image using a predetermined coefficient set corresponding to the distance from the imaging position of the lensless imaging device 11 to the subject surface G1, and outputs the image as the final image (restored image) (corresponding to the image G3) to the output unit 34. That is, simultaneous equations using the coefficient sets corresponding to the binary mask 31 described with reference to Formulas (1) to (3) described above is configured and solved for the final image, thereby the final image (restored image) is obtained.

In step S14, the output unit 34 performs signal processing and outputs the final image as an image signal.

That is, according to the series of processing described above, modulation is performed using the mask without using the lens, and then the final image (restored image) is reconstructed using the coefficient set. Therefore, height reduction is realized, and images at various distances can be reconstructed by one imaging.

<Binary Mask Including URA Pattern>

Next, the binary mask 31 including the URA pattern will be described. In a case where the transmission region and the light-shielding region are regarded as a binary pattern including 1 and 0, respectively, and an array a (x, y) and an array b (x, y) constituting a mask including a two-dimensional binary pattern are defined, a two-dimensional periodic cross-correlation function φab between the array a (x, y) and the array b (x, y) is defined by Formula (4) below.

[Math. 1]

$$\Phi_{ab}(\delta_x, \delta_y) = \sum_{x=0}^{N_x-1} \sum_{y=0}^{N_y-1} a(x, y)b((x + \delta_x)\bmod N_x, (y + \delta_y)\bmod N_y) \tag{4}$$

Here, φab is a periodic cross-correlation function between the arrays a and b in a case where the array b is shifted from the array a by (δx, δy). Furthermore, an x coordinate of the array b is a remainder of the number of elements Nx that is a period of the pattern in an x direction in a case where an x coordinate of the array a is shifted by δx, and a y coordinate of the array b is a remainder of the number of elements Ny that is a period of the pattern in a y direction in a case where a y coordinate of the array a is shifted by δy.

Moreover, a periodic autocorrelation function φaa of a two-dimensional binary array a (x, y) configured by a two-dimensional array including a URA pattern of Nx×Ny is defined by Formula (5) below.

[Math. 2]

$$\Phi_{aa}(\delta_x, \delta_y) = const, \forall \delta_x \in \{0, 1, ..., N_x - 1\}, \tag{5}$$
$$\delta_y \in \{0, 1, ..., N_y - 1\}, |\delta_x| + |\delta_y| > 0$$

That is, in the two-dimensional URA pattern, the periodic autocorrelation function is expressed as a function having a fixed side lobe.

This definition can be generalized in any dimension, and in particular, in the case of one-dimension, the definitions of Formulas (4) and (5) described above are expressed as Formulas (6) and (7) below.

[Math. 3]

$$\Phi_{ab}(\delta) = \sum_{i=0}^{N-1} a(i)b((i + \delta)\bmod N) \tag{6}$$

[Math. 4]

$$\Phi_{aa}(\delta) = const, \forall \delta \in \{1, ..., N - 1\} \tag{7}$$

Here, for example, in a case where a one-dimensional array a(n) is (a(0), a(1), a(2)) (in a case where a(n)=(a(0), a(1), a(2))), φaa(0), φaa(1), and φaa(2) are expressed by Formulas (8) to (10) below. That is, in a case where a(0), a(1), and a(2) are all constants, φaa(0), φaa(1), and φaa(2) are all fixed side lobes.

$$\Phi aa(0) = \tag{8}$$
$$(a(0), a(1), a(2)) \cdot (a(0), a(1), a(2)) = a(0)^2 + a(1)^2 + a(2)^2$$
$$\Phi aa(1) = (a(0), a(1), a(2)) \cdot (a(1), a(2), a(0)) = \tag{9}$$
$$a(0) \cdot a(1) + a(1) \cdot a(2) + a(2) \cdot a(0)$$
$$\Phi aa(2) = (a(0), a(1), a(2)) \cdot (a(2), a(0), a(1)) = \tag{10}$$
$$a(0) \cdot a(2) + a(1) \cdot a(0) + a(2) \cdot a(1)$$

One method of generating a mask of a two-dimensional URA pattern having a size of Nx×Ny includes a method of convolving (multiplying) an array a(n) including a one-dimensional URA patterns of lengths Nx and Ny. This can be achieved when the lengths Nx and Ny are relatively prime numbers, i.e., when a(n) is a(n mod Nx, n mod Ny).

Note that, as a method of generating a mask of a two-dimensional URA pattern, other methods have been proposed, but this is the method in which the mask can be generated most easily. Therefore, here, an example of generating a mask using the method of convolving the array a(n) including one-dimensional URA patterns of the lengths Nx and Ny will be described.

With the configuration as described above, since the binary mask 31 including the URA pattern is provided at the preceding stage of the imaging element 32, it cannot be the same size as the imaging element 32 in consideration of the angle of view. Furthermore, in consideration of the angle of view, the binary mask 31 has a configuration in which two masks of the two-dimensional URA pattern for the imaging element 32 are arranged in each of the horizontal direction and the vertical direction (2×2) in order to realize a complete circulation-type pattern for the pixels of the imaging element 32.

Figure 4:
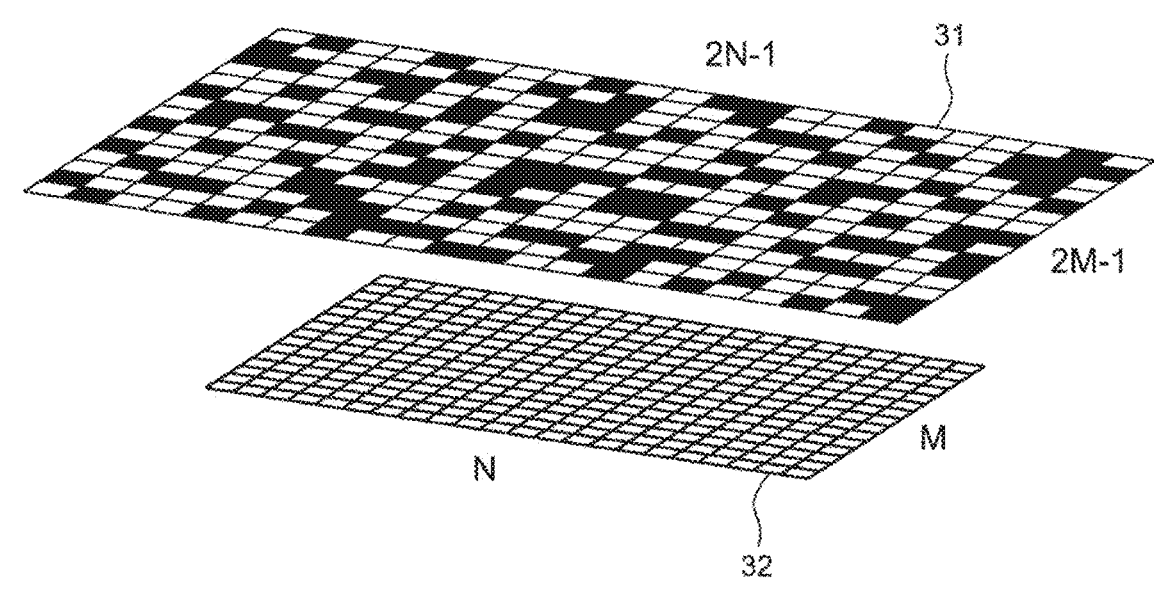
FIG. 4 is a diagram illustrating a configuration of a mask in FIG. 1.

More specifically, as illustrated in FIG. 4, in a case where the size of the imaging element 32 is M×N, the binary mask 31 has a size of 2M−1×2N−1 at the preceding stage of the imaging element 32.

By the way, by the mask 31 including binary values of the transmission region and the light-shielding region, the lengths Nx and Ny of the arrays that become the URA pattern satisfying the condition of the above-described Formula (5) are limited, and thus, the array of the length applicable to the mask 31 is also limited.

Accordingly, the size of the mask 31 applicable to the size of the imaging element 32 is also limited, which is a limitation in the design of the lensless imaging device.

Figure 5:
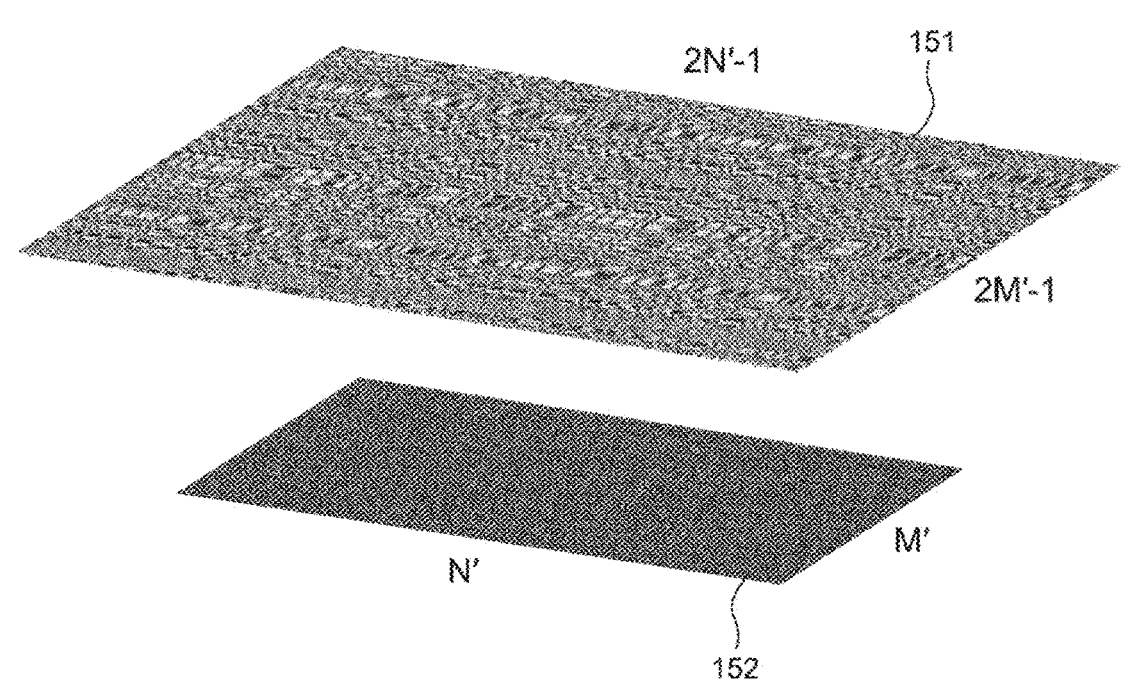
FIG. 5 is a diagram illustrating a configuration of a mask of a lensless imaging device of the present disclosure.

Therefore, in the lensless imaging device of the present disclosure, as illustrated in FIG. 5, in addition to the transmission region and the light-shielding region, a mask 151 including a non-binary URA pattern including a region including a translucent filter (for example, a neutral density (ND) filter) or the like that transmits light amounts according to various transmittances is configured. With such a configuration, it is possible to expand options of the lengths Nx and Ny of the array that becomes the URA pattern satisfying the condition of the above-described Formula (5).

Note that the imaging element 152 in FIG. 5 has a configuration corresponding to the imaging element 32. Furthermore, FIG. 5 illustrates an example in which the size of the imaging element 152 is N'×M', and the size of the mask 151 is 2N'−1×2M'−1.

As described above, in the present disclosure, instead of the mask (binary mask) including the binary URA pattern, the mask (non-binary mask) including the non-binary URA pattern is used as the mask disposed at the preceding stage of the imaging element, accordingly, options of the lengths Nx and Ny of the arrays that become the URA pattern are expanded, and the degree of freedom in designing the sizes of the imaging element and the mask in the lensless imaging device is improved.

Furthermore, by using a mask including a non-binary URA pattern, options of the lengths Nx and Ny of the arrays that become the URA pattern are expanded, and a mask of an appropriate size can be set for the size of the imaging element. As a result, the image quality of the image reconstructed is improved.

<<2. Configuration Example of Lensless Imaging Device of Present Disclosure>>

Next, a configuration example of the lensless imaging device of the present disclosure will be described with reference to a block diagram of FIG. 6.

Figure 6:
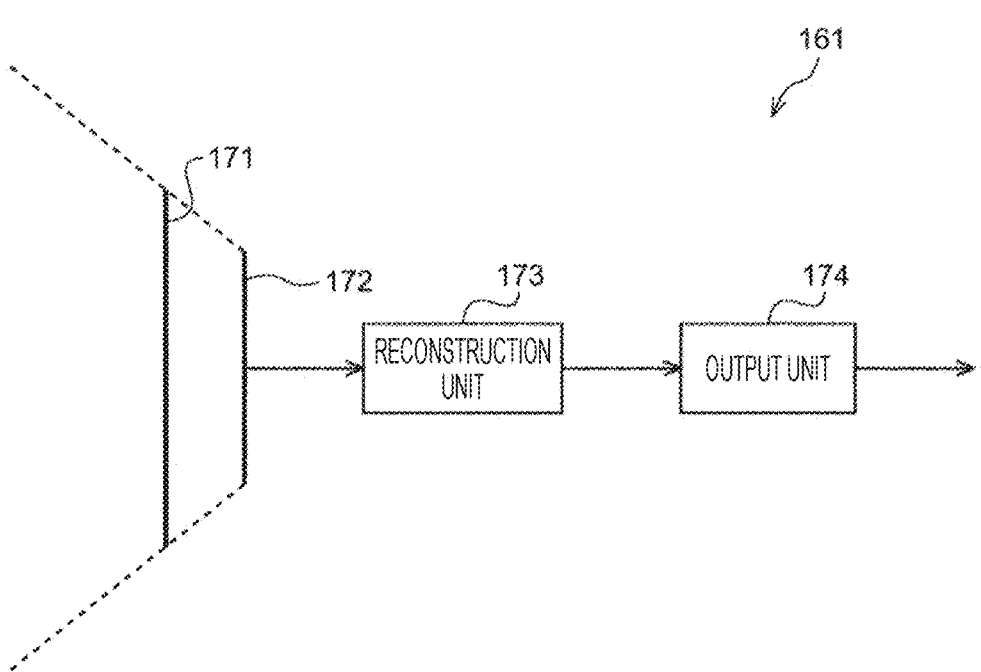
FIG. 6 is a diagram illustrating a configuration example of a lensless imaging device of the present disclosure.

A lensless imaging device 161 in FIG. 6 is a lensless camera to which the technology of the present disclosure is applied, and includes a mask 171, an imaging element 172, a reconstruction unit 173, and an output unit 174.

Note that the mask 171, the imaging element 172, the reconstruction unit 173, and the output unit 174 in FIG. 6 have configurations corresponding to the mask 31, the imaging element 32, the reconstruction unit 33, and the output unit 34 in FIG. 1, and have the same basic functions. Furthermore, the mask 171 and the imaging element 172 have configurations corresponding to the mask 151 and the imaging element 152 in FIG. 5.

Furthermore, the imaging element 172, the reconstruction unit 173, and the output unit 174 of the lensless imaging device 161 in FIG. 6 basically have the same functions as the imaging element 32, the reconstruction unit 33, and the output unit 34 of the lensless imaging device 11 in FIG. 1, and thus the description thereof will be appropriately omitted. However, coefficients used for reconstruction in the reconstruction unit 173 correspond to the configuration of the mask 171.

More specifically, the mask 171 in FIG. 6 has a configuration corresponding to the mask 151 in FIG. 5, and is different from the mask 31 in FIG. 1 in that it is a non-binary mask including a region including a translucent filter or the like having various transmittances in addition to the transmission region and the light-shielding region.

That is, in a case where each of the transmission region, the light-shielding region, and also the translucent region are expressed as a non-binary pattern including transmittance 1, 0, t(0<t<1), similarly to the mask 31, the mask 171 includes a circulation-type pattern, for example, a uniform redundant arrays (URA) pattern.

More specifically, the mask 171 includes, for example, a filter such as a neutral density (ND) filter in which transmittance corresponding to a non-binary URA pattern is formed in each region obtained by dividing the mask 171 into a rectangular shape (matrix shape) as described above.

Note that, as long as the mask 171 has a structure in which a matrix-shaped transmittance distribution corresponding to a two-dimensional non-binary URA pattern is formed, each region may include a member other than the filter, and for example, a diffractive optical element, a free-form lens, a Fresnel zone plate (FZP), or the like having various focal lengths corresponding to the transmittance that becomes a non-binary URA pattern may be arranged.

Note that, hereinafter, the mask 171 is also referred to as the non-binary mask 171 as necessary.

(Mask Generated on the Basis of Array of One-Dimensional Non-Binary URA Pattern)

As described above, in the case of a lensless imaging device using a two-dimensional binary mask generated from a one-dimensional array including a binary URA pattern, it is known that quality related to image reconstruction can be analyzed by measuring variance of a reconstructed image caused by an error of an imaging element (see Non-Patent Document 4).

According to this technology, it is known that the quality related to the reconstruction in the lensless imaging device increases as the sum of the reciprocal of the square of each element in a case where the one-dimensional array used for generating the binary mask is multiplied by discrete Fourier transform (DFT) decreases.

That is, it is known that a sum S expressed by Formula (11) below is minimized with the optimal one-dimensional array a(n) with respect to the quality related to the reconstruction in the lensless imaging device using a binary mask including a URA pattern (see Non-Patent Document 4).

[Math. 5]

$$S = \sum i = 0..N-1 \frac{1}{|A(i)|^2} \tag{11}$$

Here, A(i) is each element in a case where the array a(n) is multiplied by discrete Fourier transform (DFT). That is, the sum S is the sum of the reciprocal of the square of each element in a case where the array a(n) is multiplied by discrete Fourier transform (DFT).

Furthermore, in Formula (11), the sum S becomes minimum in a case where all $|A(i)^2|$ if i>0 are equal.

In view of this, evaluation regarding the reconstruction in the lensless imaging device according to Formula (11) is applied to a case where a non-binary array is used. Here, in all the non-binary arrays a(n) of the length N, in a case where the average value ρ of the elements a(0), a(1), . . . a(N−1) and the sum of squares of the elements a(0), a(1), . . . a(N−1) are constants, the relationship of Formula (12) below is established.

[Math. 6]

$$\begin{cases} |A(0)|^2 = (\rho N)^2 \\ |A(i)|^2 = \dfrac{N\xi - (\rho N)^2}{N-1} \end{cases} \quad (12)$$

Moreover, the periodic autocorrelation function φaa of the non-binary array a(n) having the length N is expressed as expressed by Formula (13) below, but according to the calculation based on the above-described condition, it is found to be a constant.

[Math. 7]

$$\Phi_{aa}(k) = \sum_{i=0\ldots N-1} a(i)\, a(i \oplus k) = \frac{(\rho N)^2 - \xi}{N-1} \quad (13)$$

where $$i \oplus k - \text{sum modulo } N, \text{ and } k = 1..N-1.$$

That is, as indicated by Formula (13), the non-binary optimal array a(n) applied to the mask in which the quality of the image reconstructed by the lensless imaging device is optimized satisfies the condition for the URA pattern indicated by Formula (5) described above.

Note that the average value ρ of a(0), a(1), . . . a(N−1) and the sum of squares of a(0), a(1), . . . a(N−1) are expressed as Formulas (14) and (15) below.

[Math. 8]

$$\rho = \frac{\sum_{i=0..N-1} a(i)}{N} \quad (14)$$

[Math. 9]

$$\xi = \sum_{i=0..N-1} a(i)^2 \quad (15)$$

From the above, in a case where the mask 171 constituting the lensless imaging device 161 is generated by convolving a non-binary one-dimensional array, it can be said that the non-binary one-dimensional array used for generating the mask, which is optimal for image reconstruction, is a URA pattern.

(Generation Example of One-Dimensional Non-Binary URA Pattern)

(Case where Length N is Relatively Small)

Next, an example of generating a one-dimensional non-binary URA pattern in a case of an array having a relatively short length in which the length N of the array is smaller than a predetermined value (here, N=10) will be described.

A one-dimensional array having a relatively short length in which the length N is smaller than the predetermined value can be obtained by analytically solving the above-described Formula (13) which is a polynomial equation.

For example, it is known that an array including a non-binary URA pattern and having a length N less than 10 can be obtained as follows by using Python library for symbolic mathematics SymPy and its function "solve ( )". Note that a2, a3, c, and a6 below are constants.

$$N = 3: [0, a2, a3]$$

$$N = 4: \left[0, a2, \, 2 \times c \times a2 \big/ \left(2 \times a2^2 + c\right), c \big/ (2 \times a2)\right]$$

-continued $$N = 5: \left[0, 0, a3, \, c \times a3 \big/ \left(a3^2 + c\right), c/a3\right]$$

$$N = 6: [0, 0, \pm\sqrt{(c/2)}, 0, \pm\sqrt{(2 \times c)}, \pm\sqrt{(c/2)}], [0, a2,$$
$$0, a2 \pm \sqrt{\left(3 \times a2^2 - c\right)}, c/(2 \times a2), a2 \pm \sqrt{\left(3 \times a2^2 - c\right)}]$$

$$N = 7: \left[0, \left((c2 + c \times a6^2 - a6^4) \pm \sqrt{\left((c2 + c \times a6^2 + a6^4)2 - 8 \times a6^4 \times c2\right)}\right) \big/ \right.$$
$$\left(2 \times a6^3\right), 0, (c - a6 \times a2) \times a6/c, 0, a6, c/a6]$$

$$N = 9: [0, 0, 0, 0, -\sqrt{c} \times \sqrt{(-1 + \sqrt{5})} \times (\sqrt{2} + \sqrt{10})/4,$$
$$0, \sqrt{c} \times \sqrt{(-1 + \sqrt{5})} \times (-\sqrt{10} + \sqrt{2})/4, -\sqrt{2} \times$$
$$\sqrt{c} \times \sqrt{(-1 + \sqrt{5})}/2, -\sqrt{2} \times \sqrt{c} \times \sqrt{(-1 + \sqrt{5})}/2],$$

$$[0, 0, 0, 0, -\sqrt{c} \times \sqrt{(-1 + \sqrt{5})} \times (\sqrt{2} + \sqrt{10})/4,$$
$$0, \sqrt{c} \times \sqrt{(-1 + \sqrt{5})} \times (-\sqrt{2} + \sqrt{10})/4,$$
$$\sqrt{2} \times \sqrt{c} \times \sqrt{(-1 + \sqrt{5})}/2, \sqrt{2} \times \sqrt{c} \times \sqrt{(-1 + \sqrt{5})}/2],$$

$$[0, 0, 0, 0, \sqrt{(-c)} \times \sqrt{(1 + \sqrt{5})} \times (-\sqrt{10} + \sqrt{2})/4,$$
$$0, -\sqrt{(-c)} \times \sqrt{(1 + \sqrt{5})} \times (\sqrt{2} + \sqrt{10})/4,$$
$$\sqrt{2} \times \sqrt{(-c)} \times \sqrt{(1 + \sqrt{5})}/2, \sqrt{2} \times \sqrt{(-c)} \times \sqrt{(1 + \sqrt{5})}/2],$$

$$[0, 0, 0, 0, \sqrt{(-c)} \times \sqrt{(1 + \sqrt{5})} \times (-\sqrt{2} + \sqrt{10})/4,$$
$$0, \sqrt{(-c)} \times \sqrt{(1 + \sqrt{5})} \times (\sqrt{2} + \sqrt{10})/4, -\sqrt{2} \times$$
$$\sqrt{(-c)} \times \sqrt{(1 + \sqrt{5})}/2, -\sqrt{2} \times \sqrt{(-c)} \times \sqrt{(1 + \sqrt{5})}/2]$$

That is, an array including a non-binary URA pattern and having a relatively short length can be treated as known as described above.

(Case where Length N is Relatively Large)

In a case of an array having a relatively large length in which the length N is larger than a predetermined value (here, N=10), the array including the one-dimensional non-binary URA pattern can be obtained as an optimal solution of Formula (13) that is a polynomial equation including physical conditions of the lensless imaging device to be configured.

In addition, by multiplying arrays each including an existing non-binary URA pattern and having a relatively small-length N, an array including a new non-binary URA pattern and having a relatively large length can be generated.

This method of multiplying the arrays each including an existing non-binary URA pattern is based on characteristics that, in a case where periodic side lobes of the two arrays whose lengths N1 and N2 are prime numbers are zero, periodic side lobes of the array having the length N1×N2, which is the product of the two arrays, are zero.

Note that see "Synthesis of binary arrays with perfect correlation properties—coded aperture imaging", Kevin Byard, Nuclear Instruments and Methods in Physics Research A 336 (1993) pp. 262-268 for this property.

In a case of generating an array including a new large-length non-binary URA pattern by multiplying arrays including existing relatively short-length non-binary URA patterns, the arrays of two existing non-binary URA patterns are taken, and some of their elements are made to be negative to shift the periodic side lobes to be zero, and then the arrays are multiplied. Moreover, since each element of the array which is the multiplication result is shifted to a non-negative value, an array including a new large-length URA pattern is generated.

Here, a method of calculating a shift amount Δ necessary for making the periodic side lobe zero will be described. For example, a non-binary array a(n) of a length N as shown in Formula (16) below is considered.

[Math. 10]

$$a = a(0), a(1), \ldots, a(N-1) \qquad (16)$$

A periodic side lobe φ' for this array a(n) is expressed by Formula (17) below.

[Math. 11]

$$\sum_{i=0 \ldots N-1} a(i)\, a(i \oplus k) = \Phi'\, (0 < k < N) \qquad (17)$$

Moreover, in order to make all the periodic side lobes φ' zero, (φ'=0), Formula (17) is expanded to solve a quadratic equation of Formula (18) below.

[Math. 12]

$$(a(0)-\triangle)(a(k)-\triangle) + (a(1)-\triangle)(a(1\oplus k)-\triangle) + \cdots + \qquad (18)$$
$$(a(N-1)-\triangle)(a((N-1)\oplus k)-\triangle) = 0$$

When this Formula (18) is simplified, Formula (19) below is obtained.

[Math. 13]

$$N\triangle^2 - 2E\triangle + \Phi' * 0 \qquad (19)$$

Here, E is the sum of the elements of the array a(n), and Δ is the shift amount.

Therefore, when the shift amount Δ is obtained on the basis of Formula (19), the shift amount Δ is expressed as Formula (20) below.

[Math. 14]

$$\triangle = \frac{E}{N} \pm \frac{\sqrt{E^2 - N\Phi'}}{N}. \qquad (20)$$

Here, as a specific example, a case of obtaining an array c including a new non-binary URA pattern having a relatively large length from relatively short-length arrays a and b below including non-binary URA patterns will be considered.

a=[0, 1, 2]
b=[0, 6, 4, 3]

Here, the periodic side lobes φ' of the arrays a and b including the non-binary URA patterns are 2 and 36, respectively, and the sums E of each element are 3 and 13, respectively.

Therefore, the shift amount Δ of the array a is calculated by using Formula (20) to be $\triangle a1 = 1+\sqrt{(1/3)}$ and $\triangle a2 = 1-\sqrt{(1/3)}$.

Furthermore, similarly, the shift amount Δ of the array b is calculated by using Formula (20) to be $\triangle b1 = 13/4+5/4$ and $\triangle b2 = 13/4-5/4$.

Therefore, $\triangle a1 = 1+1\sqrt{(1/3)}$ and $\triangle b2 = 2(=13/4-5/4)$ are selected as the shift amounts for the arrays a and b, respectively, and when the arrays are shifted, the following arrays a' and b' in which the periodic side lobes become 0 are obtained.

$$a' = a - \triangle a1 = \left[-1 - \sqrt{(1/3)}, -\sqrt{(1/3)}, 1 - \sqrt{(1/3)}\right]$$
$$b' = b - \triangle b2 = [-2, 4, 2, 1]$$

Moreover, by multiplying the array a' having the length 3 by the array b' having the length 4, the array a'×b' having a new length 12(=3×4) is obtained.

$$a' \times b' = [a'(1)\times b'(1), a'(2)\times b'(2), a'(3)\times b'(3),$$
$$a'(1)\times b'(4), a'(2)\times b'(1), a'(3)\times b'(2), a'(1)\times b'(3), a'(2)\times b'(4),$$
$$a'(3)\times b'(1), a'(1)\times b'(2), a'(2)\times b'(3), a'(3)\times b'(4)] =$$
$$[2 + 2\sqrt{(1/3)}, -4\sqrt{(1/3)}, 2 - 2\sqrt{(1/3)}, -1 - \sqrt{(1/3)},$$
$$2\sqrt{(1/3)}, 4 - 4\sqrt{(1/3)}, -2 - 2\sqrt{(1/3)}, -(1/3), -2 +$$
$$2\sqrt{(1/3)}, -4 - 4\sqrt{(1/3)}, -2\sqrt{(1/3)}, 1 - \sqrt{(1/3)}]$$

Then, by subtracting $-4-4(1/3)$, which is the smallest among the elements of the array a'×b', from each element, all the elements are shifted to non-negative values, so that the array c including the non-binary URA pattern with the length of 12 is obtained as follows.

$$c = \left[6 + 6\sqrt{(1/3)}, 4, 6 + 2\sqrt{(1/3)}, 3 + 3\sqrt{(1/3)}, 4 +\right.$$
$$6\sqrt{(1/3)}, 8, 2 + 2\sqrt{(1/3)}, 4 + 3\sqrt{(1/3)}, 2 + 6\sqrt{(1/3)}, 0, 4 +$$
$$\left.2\sqrt{(1/3)}, 5 + 3\sqrt{(1/3)}\right]$$

Here, the center peak of the periodic autocorrelation of the array c is 291+264/√3, and the periodic side lobe is 216+264/√3.

By the above method, it is possible to generate from non-binary arrays including URA patterns having lengths of 3 and 4 an array including a new non-binary URA pattern having a larger length, which is a length of 12. Note that the above specific example is an example, and non-binary arrays including URA patterns of other lengths can also be generated on the basis of the known non-binary array by a similar method.

That is, as described above, an array including a one-dimensional non-binary URA pattern and having a relatively small length N can be obtained by using Python library for symbolic mathematics SymPy and its function "solve ( )" and can be used as a known array. Furthermore, an array having a relatively large-length N can be obtained by multiplying known arrays each having a relatively small-length N.

Then, the mask 171 of the two-dimensional non-binary URA pattern can be obtained by using arrays including one-dimensional non-binary URA patterns of two lengths.

<Imaging Process by Lensless Imaging Device in FIG. 6>

Figure 7:
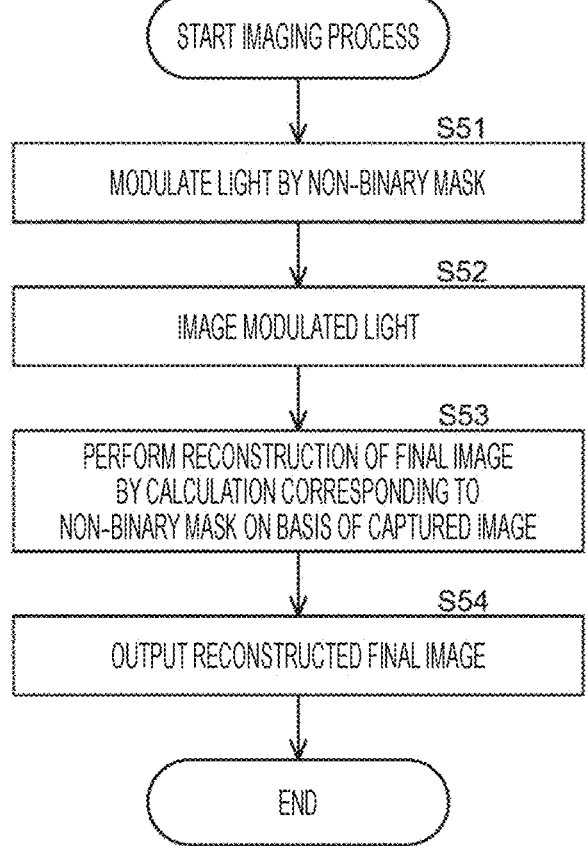
FIG. 7 is a flowchart illustrating an imaging process by the lensless imaging device in FIG. 6.

Next, an imaging process performed by the lensless imaging device 161 in FIG. 6 will be described with reference to a flowchart of FIG. 7.

In step S51, the mask (non-binary mask) 171 modulates the light from the subject surface G1 and causes the light to enter the imaging element 172.

In step S52, the imaging element 172 captures an image formed by light from the subject surface G1 and modulated by the mask (non-binary mask) 171, and outputs the captured image to the reconstruction unit 173 as a modulated image (corresponding to the modulated signal G2).

In step S53, on the basis of the modulated image (corresponding to the modulated signal G2) obtained by capturing the image formed by the modulated light output from the imaging element 172, the reconstruction unit 173 reconstructs an image using a predetermined coefficient set corresponding to the distance from the imaging position of the lensless imaging device 161 to the subject surface G1, and outputs the image as the final image (restored image) (corresponding to the image G3) to the output unit 174.

In step S54, the output unit 174 performs signal processing and outputs the final image as an image signal.

That is, also according to the series of processing described above, modulation is performed using the mask without using the lens, and then the final image (restored image) is reconstructed using the coefficient set. Therefore, height reduction is realized, and images at various distances can be reconstructed by one imaging.

Furthermore, since the mask 171 includes a non-binary URA pattern, it is possible to expand options of lengths as an array of a URA pattern, and thus, it is possible to improve the degree of freedom in design according to the physical sizes of the mask 171 and the imaging element 172.

Moreover, since it is possible to generate a mask in units of an array including a URA pattern having an appropriate length with respect to the size of the imaging element 172, it is possible to improve quality of an image reconstructed.

Furthermore, since the mask 171 includes a non-binary URA pattern, it is possible to suppress a diffraction phenomenon even for the incident light of the wavelength band that is easily affected by diffraction due to the presence of the translucent region according to the transmittance, and thus, it is possible to suppress the deterioration in the quality of the image related to the reconstruction due to the diffraction phenomenon.

<Comparison Example in Case of Using Non-Binary Mask, Binary Mask, and Random Mask>

Figure 8:
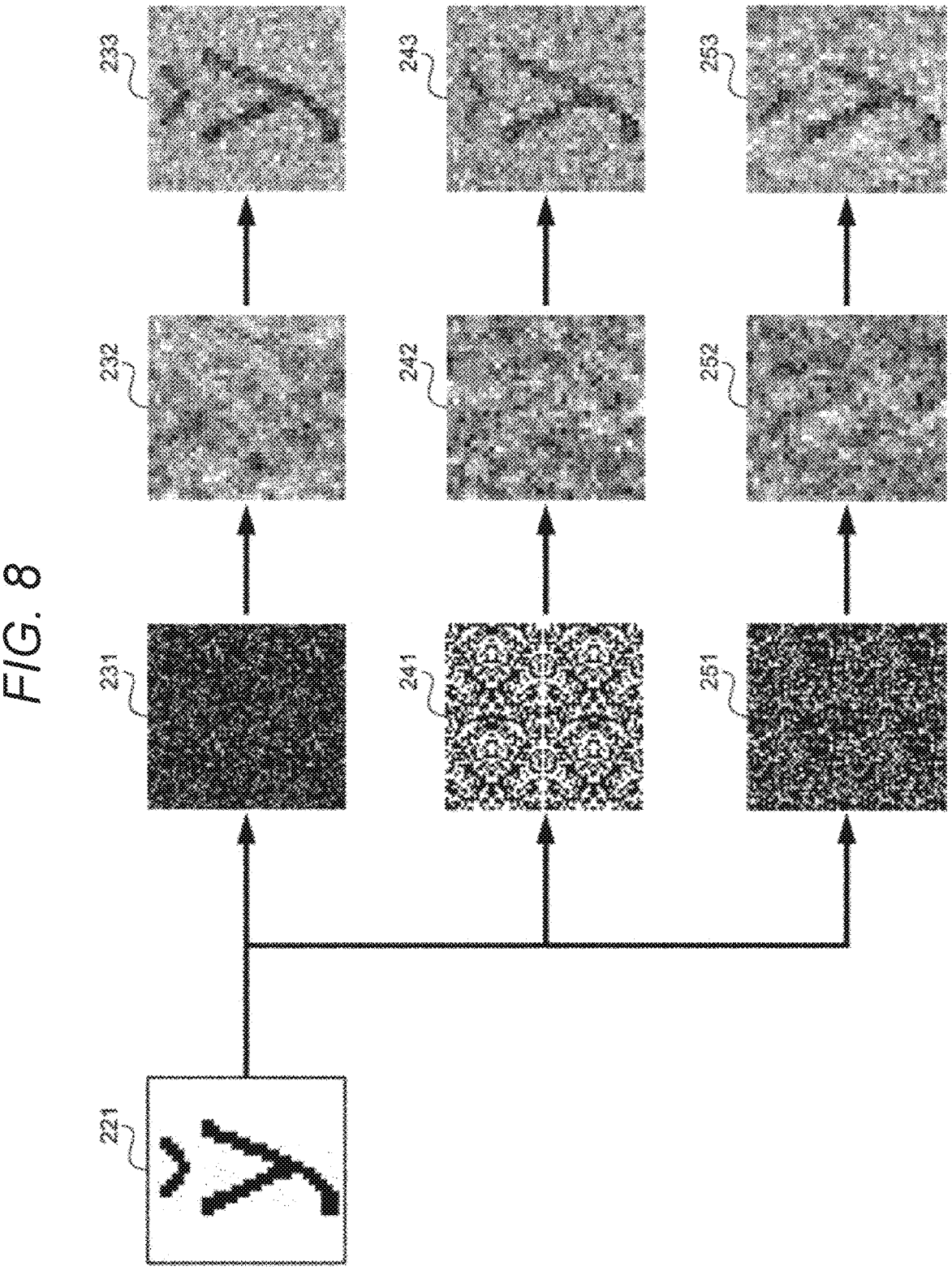
FIG. 8 is a diagram illustrating comparison of images reconstructed in a case of using a non-binary mask, a binary mask, and a random mask.

For example, a comparative example of an image reconstructed from an input image 221 having a size of 31 pixels×33 pixels in FIG. 8 in a case where each of a non-binary mask 231, a binary mask 241, and a random mask 251 having a size of 61 pixels×65 pixels illustrated from the top of FIG. 8 is used as the mask 171 in the lensless imaging device 16 will be described.

Note that the size of 31 pixels×33 pixels of the input image is based on a one-dimensional array having a length N of 1023 (=31×33) obtained by the above-described method, and the size of each of the non-binary mask 231, the binary mask 241, and the random mask 251 is 61(=31×2−1) pixels×65(=33×2−1) pixels.

Here, when the input image 221 is transmitted through the non-binary mask 231, it is captured as a modulated image 232 by the imaging element 172, when the input image is transmitted through the binary mask 241, it is captured as a modulated image 242, and when the input image is transmitted through the random mask 251, it is captured as a modulated image 252.

Note that in this example, each of the modulated images 232, 242, and 252 is an image obtained after the input image 221 is modulated by each of the non-binary mask 231, the binary mask 241, and the random mask 251, the same amount of random noise is added, and the deconvolution processing by the Wiener filter is performed.

Moreover, a final image 233 is reconstructed by the signal processing of the reconstruction unit 173 based on the modulated image 232, a final image 243 is reconstructed by the signal processing of the reconstruction unit 173 based on the modulated image 242, and a final image 253 is reconstructed by the signal processing of the reconstruction unit 173 based on the modulated image 252.

By this comparison, it is clear that the final image 243 reconstructed in the case where the mask 171 is the binary mask 241 has a higher image quality than the final image 253 reconstructed in the case where the mask is the random mask 251.

Furthermore, it is clear that the final image 233 reconstructed in the case where the mask 171 is the non-binary mask 231 has a higher image quality than the final image 243 reconstructed in the case where the mask is the binary mask 241.

Moreover, also in the evaluation of the quality related to the reconstruction using the above-described Formula (11) based on the final images 233, 243, and 253, the total sum S of the final image 233 using the non-binary mask 231 is minimized, and it is shown that the quality related to the reconstruction using the non-binary mask 231 is the highest.

That is, the non-binary mask 231 used for the mask 171 can configure a mask based on the array of the URA pattern having the optimal length in terms of the positional relationship with the imaging element 172 and the like as the option of the length of the array that becomes the URA pattern is expanded, and thus, it is possible to improve the image quality of the final image 233 reconstructed.

More specifically, in the case of the non-binary mask 231, the sum S obtained by Formula (11) is smaller than that in the case of the binary mask 241, and the non-binary mask 231 has a frequency distribution and an overall transmittance in a sparser distribution as a whole while being equal to those of the binary mask 241. Therefore, it is possible to realize the reconstruction with high noise resistance and to improve the image quality of the final image 233.

<<3. Generation Example of Non-Binary Mask>>

A generation example in which a non-binary mask realized by the above-described array having a relatively large-length N is generated from the array having a relatively small-length N will be described.

Figure 9:
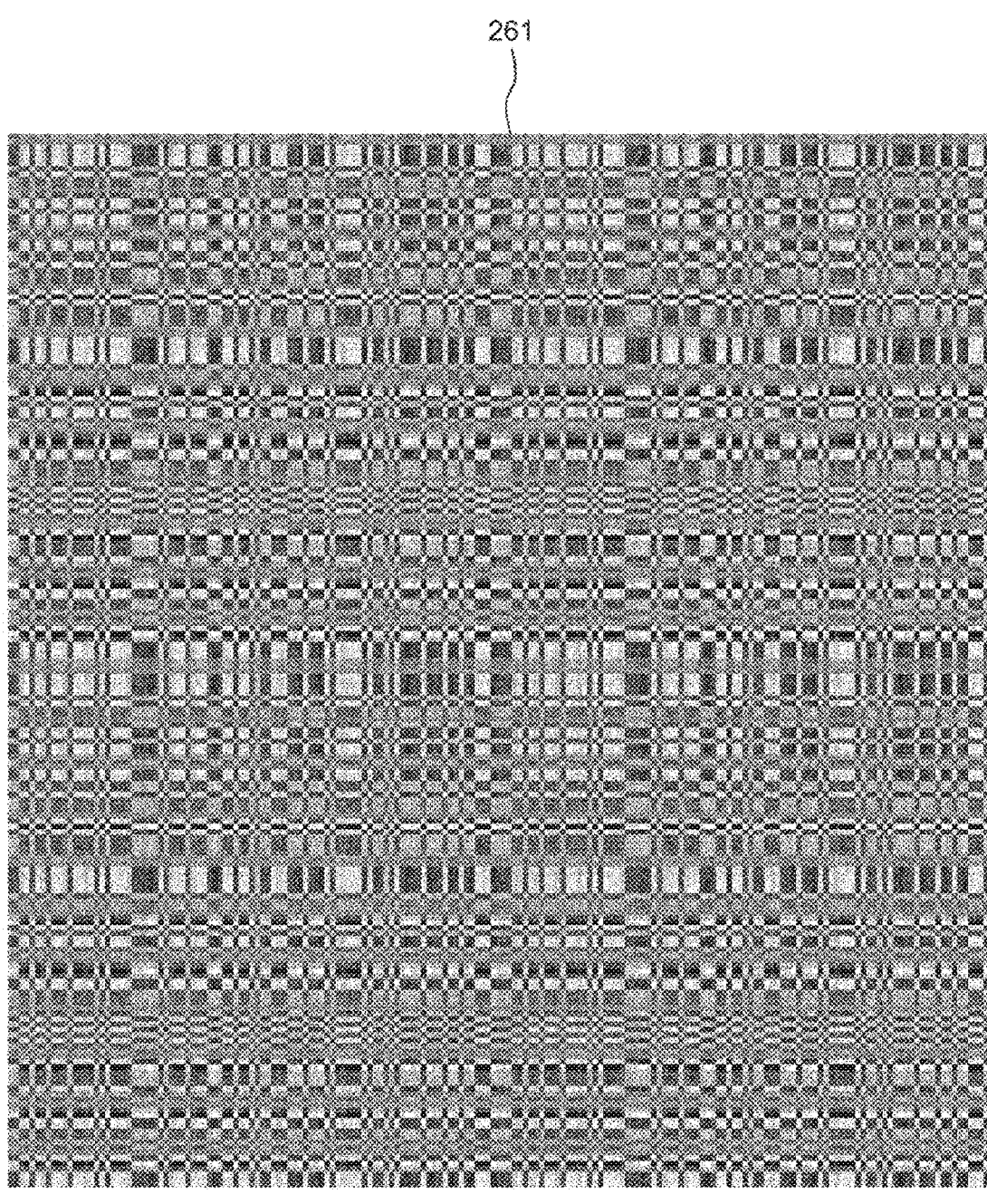
FIG. 9 is a diagram illustrating an example of generating a non-binary mask including a sequence having a relatively large length.

Here, an example of generating the non-binary mask 261 having a size of 92 pixels×99 pixels as illustrated in FIG. 9 will be described as the configuration of the mask 171.

Note that the arrays including the non-binary URA patterns having the lengths 92 and 99 are not known arrays. In this regard, see "UNIFORMLY REDUNDANT ARRAYS", Busboom, A. et al., Experimental Astronomy, v. 8, Issue 2, p. 97-123 (1998).

Here, 92 can be decomposed into 4×23, and 99 can be decomposed into 9×11, and both values are constituted by prime numbers.

Therefore, a mask including a two-dimensional non-binary URA pattern of 92×99 can be generated by multiplication using the following one-dimensional arrays a to d in which the lengths N are 4, 23, 9, and 11. Note that each of the following arrays a to d is an array in which each element is shifted to be non-negative so that the periodic side lobe is 0.

$$a = [1, 0, 0, 0]$$

$$b = [0, 0, 0, 0, 0, 1, 0, 0, 0, 0, 0, 1, 1, 1, 1, 1, 1, 1, 1]$$

-continued $$c = [0, 0, 0, 0, (\sqrt{5} + 1), 0, (\sqrt{5} - 1), 2, 2]$$

$$d = [0, 0, 0, 1, 0, 0, 1, 1]$$

Here, the array including a non-binary URA pattern is only the array c, and each of the arrays a, b, and d is an array including a binary URA pattern.

By multiplying the arrays a and b obtained as described above, an array including a binary URA pattern having a length N of 92 is generated, and by further multiplying the arrays c and d, an array including a non-binary URA pattern having a length N of 99 is generated.

Then, a mask including a non-binary URA pattern of 92 pixels×99 pixels as illustrated in FIG. 9 is generated on the basis of the obtained two arrays.

Figure 10:
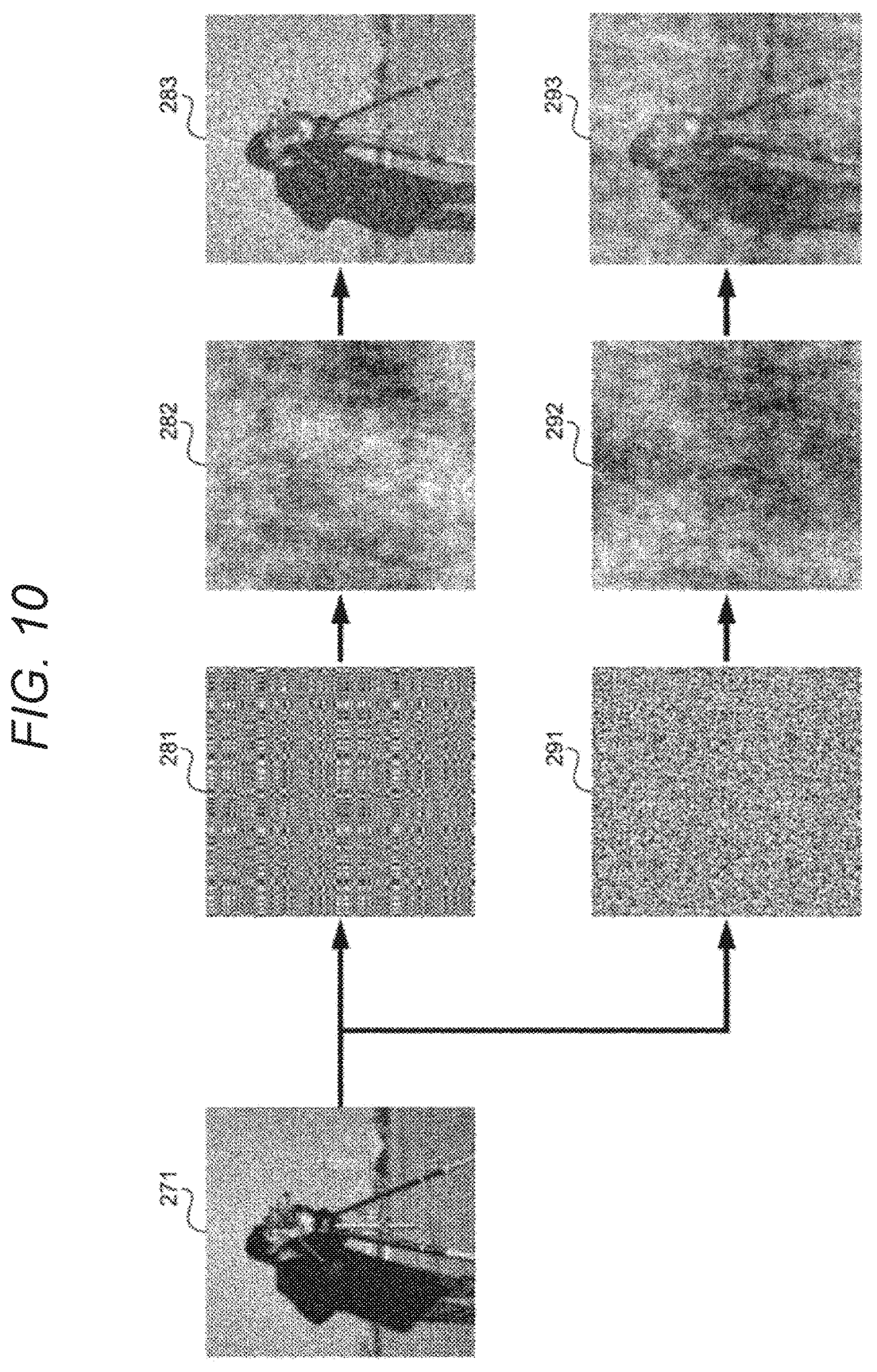

<Comparison of reconstructed images in case of using non-binary mask of FIG. 9 and binary mask of the same size as non-binary mask of FIG. 9> FIG. 10 is a comparison between a final image 283 reconstructed after an input image 271 having the size of 92 pixels×99 pixels is modulated using the non-binary mask 281 of 183 (=92×2−1) pixels× 197(=99×2−1) pixels in which the above-described non-binary mask 268 is arranged in 2×2 and a final image 293 reconstructed after the modulation using a binary mask 291 having the same size.

Note that, as described above, since it is not possible to form arrays including the binary URA patterns having the lengths of 92 and 99, it has not been possible to realize a binary mask of the URA pattern having the size of 183(=92× 2−1) pixels×197(=99×2−1) pixels.

In FIG. 10, the final image 293 reconstructed by the modulation using the binary mask 291 having the size of 183(=92×2−1) pixels×197(=99×2−1) pixels, which could not be realized by the binary URA pattern so far, is compared with the final image 283 reconstructed by the modulation using the non-binary mask 281 which can be realized by the technology of the present disclosure.

That is, when the input image 271 is modulated by using the non-binary mask 281 of 183 pixels×197 pixels in which the above-described non-binary mask 268 is arranged in 2×2 as the mask 171, it is captured as a modulated image 282 by the imaging element 172.

Then, signal processing is performed by the reconstruction unit 173 on the basis of the modulated image 282 captured by the imaging element 172. As a result, the final image 283 is reconstructed.

On the other hand, when the input image 271 is modulated by using the binary mask 291 of 183 pixels×197 pixels as the mask 171, it is captured as a modulated image 292 by the imaging element 172.

Then, signal processing is performed by the reconstruction unit 173 on the basis of the modulated image 292 captured by the imaging element 172. As a result, the final image 293 is reconstructed.

By this comparison between the final images 283 and 293, it is clear that the final image 283 reconstructed in the case where the non-binary mask 281 is used as the mask 171 has a higher image quality than the final image 293 reconstructed in the case where the binary mask 291 is used as the mask 171.

That is, according to FIG. 10, by applying the method of the present disclosure, a mask having a size that could not be generated conventionally with a binary URA pattern can be generated with a non-binary URA pattern, and it has become clear that image quality of the final image reconstructed can be further improved by applying the generated non-binary mask.

As described above, according to the present disclosure, by using a non-binary mask including an array of a non-binary URA pattern as the mask provided at the preceding stage of the imaging element constituting the lensless imaging device, it is possible to set an array including a URA pattern having the optimum length for image reconstruction according to the relationship between the size of the imaging element and the size of the mask. Therefore, it is possible to suppress a decrease in resolution caused by limiting the array having the appropriate length that becomes the URA pattern.

Furthermore, by using the non-binary mask, it is possible to configure the mask on the basis of arrays having various lengths optimum for image reconstruction, and thus, it is possible to improve the degree of freedom regarding the designs of the imaging element and the mask.

Moreover, it is possible to suppress a diffraction phenomenon even for the incident light of the wavelength band that is easily affected by diffraction due to the non-binary mask including the translucent region according to the transmittance, and thus, it is possible to suppress the deterioration in the quality of the reconstructed image due to the diffraction phenomenon.

Note that, in the above description, an example has been described in which a non-binary mask realized by arranging a filter such as a neutral density (ND) filter for the transmission region, the light-shielding region, and the translucent region in a matrix on a plane is used as a mask provided at the preceding stage of the imaging element. However, a configuration other than the mask including the filter may be used as long as the mask has a configuration capable of applying the modulation similar to the non-binary mask described above to incident light. For example, a mask capable of applying similar modulation to incident light may be configured by using a diffractive optical element, a free-form lens, a Fresnel zone plate (FZP), and the like.

Furthermore, each of the steps described in the above-described flowcharts can be executed by one device or executed by a plurality of devices in a shared manner.

Moreover, in a case where a plurality of pieces of processing is included in one step, the plurality of pieces of processing included in the one step can be executed by one device or executed by a plurality of devices in a shared manner.

Furthermore, the present disclosure can also have the following configurations.

<1> An imaging device including:

a mask that includes a plurality of optical elements having different transmittances and being arranged in a pattern defined by non-binary uniformly redundant arrays (URA) and modulates incident light to modulated light by transmitting the incident light through the plurality of optical elements;

an imaging element that captures a modulated image including the modulated light transmitted through the mask; and a reconstruction unit that reconstructs an image corresponding to the incident light on the basis of the modulated image.

<2> The imaging device according to <1>, in which the plurality of optical elements is a plurality of filters having different transmittances and being arranged in a matrix in the pattern defined by the non-binary URA.

<3> The imaging device according to <2>, in which the plurality of filters is ND filters.

<4> The imaging device according to <1>, in which
the plurality of optical elements includes a free-form lens
having a plurality of focal lengths corresponding to the
pattern defined by the non-binary URA.

<5> The imaging device according to <1>, in which
the plurality of optical elements includes a diffractive
optical element having a plurality of focal lengths
corresponding to the pattern defined by the non-binary
URA.

<6> The imaging device according to <1>, in which
the plurality of optical elements includes a Fresnel zone
plate (FZP) having a plurality of focal lengths corre-
sponding to the pattern defined by the non-binary URA.

<7> The imaging device according to <1>, in which
each element of a one-dimensional array constituting the
pattern defined by the non-binary URA is non-negative.

<8> The imaging device according to <1> to <7>, in
which
a one-dimensional array of a predetermined length con-
stituting the pattern defined by the non-binary URA is
generated on the basis of a multiplication result of
one-dimensional arrays defined by non-binary URA of
different lengths that are mutually prime.

<9> The imaging device according to <8>, in which
the one-dimensional array having the predetermined
length and constituting the pattern defined by the
non-binary URA is generated by shifting and multiply-
ing the one-dimensional arrays defined by the non-
binary URA of the different lengths that are mutually
prime such that periodic side lobes become zero, and
further subtracting a value of a smallest element among
elements constituting the array obtained as the multi-
plication result from each element.

<10> A method of operating an imaging device,
the imaging device including:
a mask that includes a plurality of optical elements having
different transmittances and being arranged in a pattern
defined by non-binary uniformly redundant arrays
(URA) and modulates incident light into modulated
light by transmitting the incident light through the
plurality of optical elements;
an imaging element that captures a modulated image
including the modulated light transmitted through the
mask; and
a reconstruction unit that reconstructs an image corre-
sponding to the incident light on the basis of the
modulated image,
the method including the steps of:
modulating the incident light into modulated light by the
mask transmitting the incident light through a plurality
of optical elements having different transmittances and
being arranged in the pattern defined by the non-binary
URA;
capturing by the imaging element a modulated image
including the modulated light transmitted through the
mask; and
reconstructing an image corresponding to the incident
light on the basis of the modulated image.

REFERENCE SIGNS LIST

151 Mask (non-binary mask)
152 Imaging element
161 Lensless imaging device
171 Mask (non-binary mask)
172 Imaging element 173 Reconstruction unit
174 Output unit

The invention claimed is:

1. An imaging device comprising:
a mask that includes a plurality of optical elements having
different transmittances, the plurality of optical ele-
ments being arranged in a pattern defined by non-
binary uniformly redundant arrays (URA), wherein the
mask is configured to modulate incident light into
modulated light by transmitting the incident light
through the plurality of optical elements;
an imaging element configured to capture a modulated
image including the modulated light transmitted
through the mask; and
circuitry configured to reconstruct an image correspond-
ing to the incident light based on the modulated image,
wherein a one-dimensional array of a predetermined
length constituting the pattern defined by the non-
binary URA is generated based on a multiplication
result of one-dimensional arrays defined by non-binary
URA of different lengths that are mutually prime.

2. The imaging device according to claim 1,
wherein the plurality of optical elements is a plurality of
filters having different transmittances and being
arranged in a matrix in the pattern defined by the
non-binary URA.

3. The imaging device according to claim 2,
wherein the plurality of filters is ND filters.

4. The imaging device according to claim 1,
wherein the plurality of optical elements includes a free-
form lens having a plurality of focal lengths corre-
sponding to the pattern defined by the non-binary URA.

5. The imaging device according to claim 1,
wherein the plurality of optical elements includes a dif-
fractive optical element having a plurality of focal
lengths corresponding to the pattern defined by the
non-binary URA.

6. The imaging device according to claim 1,
wherein the plurality of optical elements includes a Fres-
nel zone plate (FZP) having a plurality of focal lengths
corresponding to the pattern defined by the non-binary
URA.

7. The imaging device according to claim 1,
wherein each element of a one-dimensional array consti-
tuting the pattern defined by the non-binary URA is
non-negative.

8. The imaging device according to claim 1,
wherein the one-dimensional array having the predeter-
mined length and constituting the pattern defined by the
non-binary URA is generated by shifting and multiply-
ing the one-dimensional arrays defined by the non-
binary URA of the different lengths that are mutually
prime such that periodic side lobes become zero, and
further subtracting a value of a smallest element among
elements constituting the array obtained as the multi-
plication result from each element.

9. A method of operating an imaging device,
the imaging device including
a mask that includes a plurality of optical elements
having different transmittances, the plurality of opti-
cal elements being arranged in a pattern defined by
non-binary uniformly redundant arrays (URA),
wherein the mask is configured to modulate incident
light into modulated light by transmitting the inci-
dent light through the plurality of optical elements, an imaging element configured to capture a modulated image including the modulated light transmitted through the mask, and circuitry configured to reconstruct an image corresponding to the incident light based on the modulated image, and the method comprising:

modulating the incident light into modulated light by the mask transmitting the incident light through a plurality of optical elements having different transmittances and being arranged in the pattern defined by the non-binary URA;

capturing by the imaging element a modulated image including the modulated light transmitted through the mask; and reconstructing an image corresponding to the incident light based on the modulated image, wherein a one-dimensional array of a predetermined length constituting the pattern defined by the non-binary URA is generated based on a multiplication result of one-dimensional arrays defined by non-binary URA of different lengths that are mutually prime.

\* \* \* \* \*